Sept. 2, 1930.   R. S. SANFORD   1,774,527
BRAKE
Filed April 6, 1928
FIG. 1.
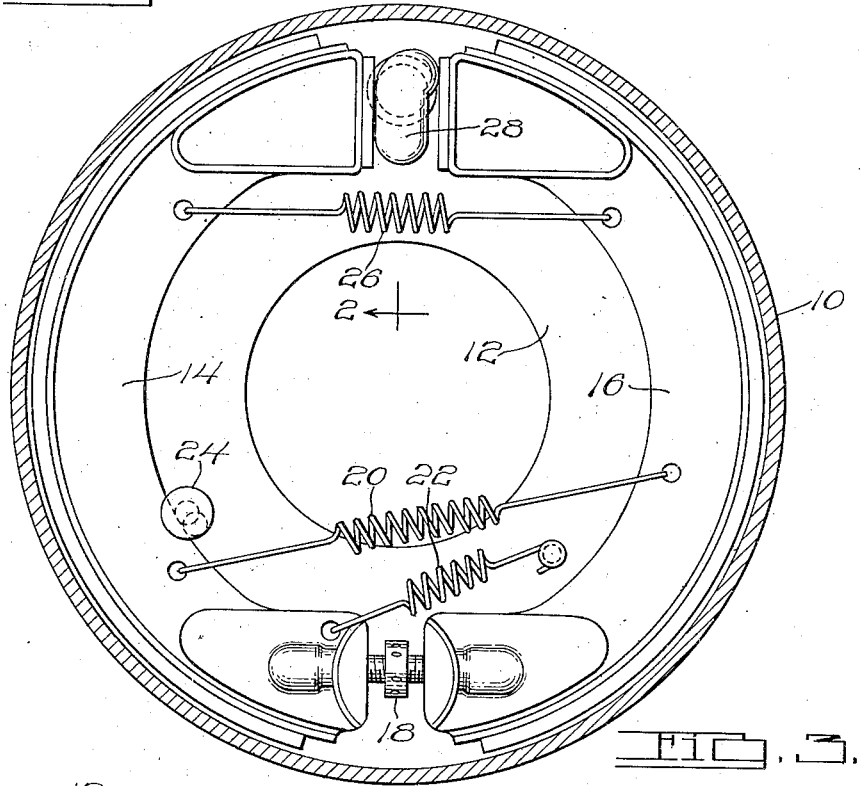
FIG. 3.
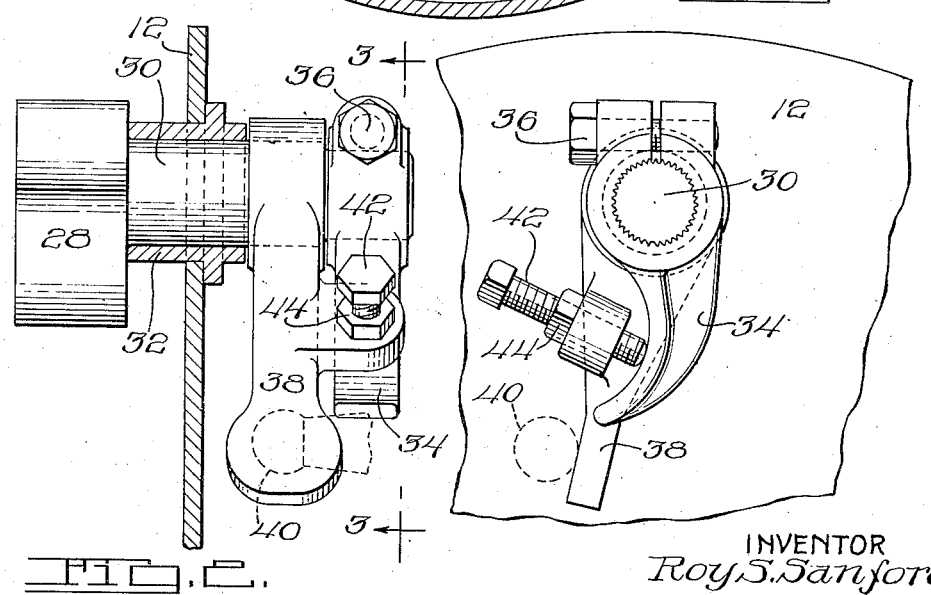
FIG. 2.
INVENTOR
Roy S. Sanford
BY
M. W. McConkey
ATTORNEY Patented Sept. 2, 1930

1,774,527

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Application filed April 6, 1928. Serial No. 267,861.

This invention relates to brakes, and is illustrated as embodied in an internal expanding brake for an automobile. An object of the invention is to provide effective and simple operating means for the brake.

Various features of novelty relate to improving the adjustment by curving the surface of an operating member so that in all positions of adjustment it is perpendicular to a lengthwise-adjustable thrust member such as a set-screw, to partially compensating the variations in friction of the brake lining by causing the brake friction means to anchor against the shorter end of an applying device such as a double cam, and to other novel and desirable constructions and arrangements which will be apparent from the following description of the illustrative embodiment shown in the accompanying drawing, in which:

Figure 1 is a vertical section through the brake, just inside the head of the brake drum, and showing the brake shoes in side elevation;

Figure 2 is a partial section through the brake, on the line 2—2 of Figure 1, showing the operating control mechanism; and Figure 3 is an elevation of the control mechanism, looking in the direction of the arrows 3—3 of Figure 1.

The illustrated brake includes a rotatable drum 10, at the open side of which is a support such as a backing plate 12, and within which is the friction means of the brake. This means is shown as including two floating interchangeable brake shoes 14 and 16, connected by an adjustable floating pivot joint 18 held together by a tensioned spring 20. The shoes are urged by a spring 22 toward a normal idle position determined by an eccentric adjustable stop 24.

The brake is applied, against the resistance of a return spring 26, by novel means shown as including a cam 28 having a long end operatively engaging shoe 14, and a short end engaging shoe 16. Cam 28 may, if desired, be integral with a camshaft 30 journaled in a bracket 32 fixedly mounted on the backing plate 12.

It will be seen that, with the drum turning counterclockwise in the normal operation with the automobile moving forward, as indicated by the arrow, the torque of the brake is taken by the cam 28 and shaft 30, through the action of the shoe 16 on the short end of the cam. In case of a sharp increase in the coefficient of friction of the brake lining, the pressure against the short end of the cam will be increased, thus resisting the brake-applying force applied by the driver and diminishing the portion of that force which is effective in applying the brake. Thus the brake is partially self-compensating for variations in lining friction, etc.

The means illustrated for operating shaft 30 includes an arm or lever 34, or an equivalent part, and splined or otherwise fixed on the shaft and shown as tightly clamped thereto by a bolt 36 and an arm or lever 38, or an equivalent part, loosely sleeved on the shaft. Part 38 is intended to be engaged by a thrust lever 40 pivoted on the axle.

Part 38 has a lengthwise-adjustable thrust member, such as a set screw 42 threaded through its end, engaging a curved surface on part 34 which is so generated that it is perpendicular to the setscrew in any and all positions of adjustment, thus eliminating all wedging action caused by an engagement at other than 90°, which might tend to spring or distort the parts. A nut 44 may be provided to lock the setscrew in adjusted position.

While one illustrative embodiment has been described in detail, it is not my intention to limit the scope of the invention to that particular embodiment, or otherwise than by the terms of the appended claims.

I claim:

1. A brake comprising, in combination, friction means, a shaft arranged to operate the friction means, and operating means for the shaft including two parts relatively adjustable angularly with respect to the shaft, one of said parts having a lengthwise adjustable thrust member and the other having a curved surface engaged by said member and perpendicular to said member in all positions of adjustment.

2. A brake comprising, in combination, friction means, a shaft arranged to operate the friction means, and operating means for the shaft including two parts relatively adjustable angularly with respect to the shaft, one of said parts having a setscrew threaded through its end, and the other having a curved surface engaged by said setscrew and perpendicular to said setscrew in all positions of adjustment.

In testimony whereof, I have hereunto signed my name.

ROY S. SANFORD.